United States Patent [19]

Nelson

[11] Patent Number: 4,520,667
[45] Date of Patent: Jun. 4, 1985

[54] NONMECHANICAL DIGITAL RAINGAUGE

[76] Inventor: Joseph A. Nelson, Box 249, Le Grand, Iowa 50142

[21] Appl. No.: 530,055

[22] Filed: Sep. 7, 1983

[51] Int. Cl.³ ............................................. G01W 1/14
[52] U.S. Cl. .................................. 73/171; 73/861.41
[58] Field of Search ............................ 73/171, 861.41; 340/602

[56] References Cited

U.S. PATENT DOCUMENTS

| | | | |
|---|---|---|---|
| 3,315,518 | 4/1967 | Charlson et al. | 340/602 |
| 3,389,601 | 6/1968 | Semplak | 73/171 |
| 3,408,477 | 10/1968 | Kolster | 340/602 |
| 3,424,977 | 1/1969 | Krobath | 340/602 |
| 3,705,533 | 12/1972 | Kahl et al. | 73/171 |
| 3,721,122 | 3/1973 | Lucas | 73/171 |
| 3,826,137 | 7/1974 | Clarke | 73/861.41 |
| 3,958,457 | 5/1976 | Mink | 73/171 |
| 4,105,028 | 8/1978 | Sadlier | 73/861.41 |

FOREIGN PATENT DOCUMENTS

| | | | |
|---|---|---|---|
| 493747 | 2/1976 | U.S.S.R. | 73/171 |
| 591786 | 2/1978 | U.S.S.R. | 73/171 |

Primary Examiner—S. Clement Swisher

[57] ABSTRACT

According to the present invention, a raingauge which is fully automatic and free of any mechanical moving parts, comprising a receiver for collecting rain water, a water transfer device designed to transfer the water received by the collector to the discharge orifice in such a way as to isolate the discharge orifice from the effects of pressure fluctuations due to wind, the momentum of the rainfall, and the impurities that may be in the rain, and a discharge orifice which is designed to discharge an equal volume of water from the device by utilizing the surface tension characteristics of water, the restriction in the discharge orifice, and the force of gravity. The net effect then, of these three forces or characteristics acting upon the water accumulating in the funnel orifice combination, being that the water will discharge in the form of a droplet and be in equal and consistent volumes. Further, the raingauge comprises an electrical probe matrix designed to sense the discharge of an equal volume of water, and an electronic counter circuit that communicates with said probe matrix by utilizing extremely low current signals, yet without the need for a signal amplifier. Said electronic counter than converts the signals from the probe matrix into a display representing the rainfall amount.

5 Claims, 3 Drawing Figures

NONMECHANICAL DIGITAL RAINGAUGE

BACKGROUND OF THE INVENTION

This invention relates in general to rain gauges and in particular to fully automatic and electronic rain gauges.

There have been a variety of attempts at developing a fully automatic rain gauge, most all of which utilize moveable mechanical parts which exhibit certain inherent limitations and tradeoffs. The basic problem to overcome in achieving a fully automatic rain gauge is the removal of very small volumes of water from the collector, incrementally, while maintaining a high degree of repeatability in the amount of each volume removed. Each removal can then be sensed and converted into a rainfall amount. Most all rain gauges commercially available today utilize a mechanical means to achieve the transfer of water in equal volumes. The disadvantages inherent in the mechanical means are size, expense, and rangeability, whereas the present invention overcomes these disadvantages due to its non-mechanical approach.

The most widely used approach in the market place today is the mechanical tipping bucket (inventors; Gerald Kahl and Guide Guideili Guidi, U.S. Pat. No. 3,705,533). The rain gauge basically consists of a collector and a series of funnels to divert the rain water to a tipping bucket mechanism. The collector and tipping bucket mechanism are so designed that each hundreth of an inch of rainfall causes the alternate fill and tip of the mechanism. A sealed glass enclosed mercury switch or similar is attached to the mechanism so that an electrical pulse is generated with each tip of the bucket.

The disadvantage of this approach is in the size required by the collector, which is typically 10 inches in diameter, due to the fact that the tipping bucket assembly requires over 25 thousanths of a cubic inch to cause tipping action. The tradeoff is that at a heavier rainfall rate, for example a 5 to 7 inch per hour rate, the tipping bucket approach will exhibit a 3% to 4% error in its precision due to its inability to transfer relatively large volumes of water.

The present invention, which incorporates a nonmechanical means to accomplish the water transfer, requires a collector no larger than 2 inches in diameter. This is a reduction in collector size of approximately 80% over the tipping bucket method. Also due to the small collector size and extremely low volumes of water transfer, a high degree of resolution in measurement can be achieved, over a wide range of rainfall rates. A resolution of 0.003 inch increments can be attained accurately over a range of 0.01 to 10.00 inches per hour rainfall rates.

Other mechanical means have been adapted such as the rotary bucket mechanism (inventor; James Mink, U.S. Pat. No. 3,958,457) which senses the level of water in a column and at a predetermined level activates a motor which turns the rotary bucket and thus removes an equal volume of water incrementally, and the paristalic pump mechanism (inventor; Colin Lucas, U.S. Pat. No. 3,721,122) which senses the level of water collected and at a predetermined level activates the pump and thus removes an equal volume of water incrementally.

Both of these methods exhibit similar inherent limitations as the tipping bucket method though with one additional disadvantage, and that being the power required for operation. The majority of power being consumed by the motor in the rotary bucket method and the pump in the paristalic pumping method. This makes the method energy inefficient, less practical for remote applications, and lacking in easy portability. The present invention by contrast, requires extremely low amounts of current for operation due to the sensing network utilized in conjunction with Complemenatary Metal Oxide Semiconductor technology (CMOS Integrated Circuitry). The sensing network is designed so that when an equal volume of water is discharged, the resistance of the rain water is detected by the sensing network, which is typically between 100,000 and 200,000 ohms, and then applied to the gate of a CMOS integrated circuit, causing the associated circuitry to "trigger". This approach virtually eliminates the need for amplifying the sensor signals which all other electronic rain gauges require. As a result then of the sensing method employed, and the unique application of CMOS integrated circuitry, this present invention could function on very small batteries for several months, making it highly energy efficient, easily adaptable for remote use, portable, and independent of power failures that could occur during a storm.

SUMMARY OF THE INVENTION

To overcome the disadvantages of mechanical rain gauges, as previously outlined, the rain gauge of the present invention has been devised which comprises essentially, a rain water collector, a water transfer means, an equal water volume discharge means, a probe matrix, and an electronic convertor/display circuit. The rain water collector means is simply an open-ended cylinder with a cross sectional area designed to receive rain water in amounts that provide optimum function, and thus accuracy. The rainfall amount collected then, will be channeled to the water transfer means which functions to transfer the rainwater collected in such a way as to isolate the equal water volume discharge means from the effects of; pressure fluctuations due to wind currents accross the rainwater collector, the force of the rainwater momentum, and from impurities that may be found in the rainwater. The equal water volume discharge means comprises a funnel orifice combination that receives the rain water from the water transfer means and allows it to accumulate until the mass of said rain water, under the force of gravity, overcomes the opposing force of the water's resistance to pass through an orifice due to its surface tension characteristics. Due to the fact that the force of gravity, the surface tension characteristics of water, and the dimensions of the funnel orifice combination remain constant, the water discharged, in the form of a droplet, will be in equal volumes. These equal volumes of water, typically between 4 and 6 thousanths of an cubic inch, will then be discharged by free fall and pass through the probe matrix, which will detect the passage of each droplet without the need for alignment consideration nor the need for signal amplification, as the probe matrix communicates directly with and triggers the electronic circuitry at which time the water droplet will fully discharge from the rain gauge. The signals received from the probe matrix are then electrically converted to represent a rainfall amount with a display resolution as low as 0.005 inches.

DESCRIPTION OF THE PREFERRED EMBODIMENT

Figure 1:
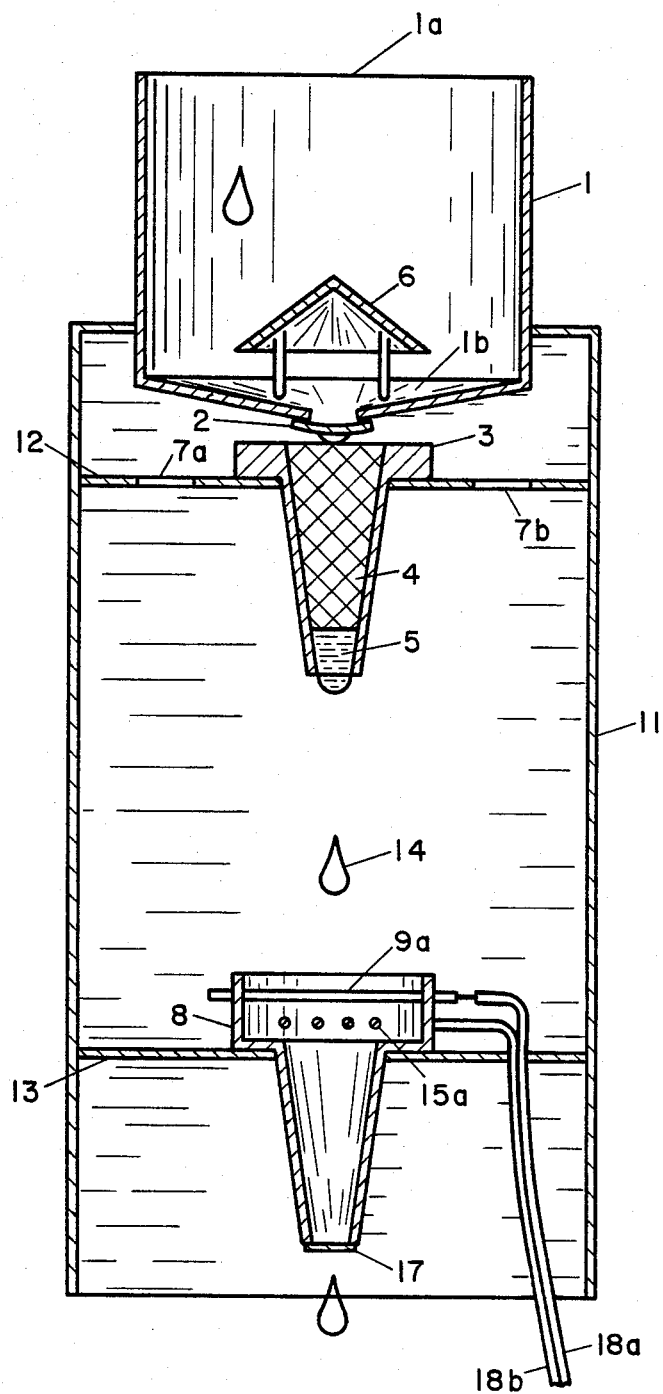
FIG. 1 is a front cross sectional view of the present invention.

Referring to the drawings and more particularly to FIG. 1, the raingauge of the present invention comprises a rainwater collector 1 which in the present invention is cylindrical in shape with a cross sectional area 1A, a water transfer means which is comprised of a deflector 6, a transfer surface 1b, and a filter 2, with items 6 and 1b being designed to impede the rainwater's momentum and to channel said rainwater to filter 2, an equal water droplet volume discharge means 3, positioned beneath the filter means, which comprises a momentum resistor means 4 and a discharge orifice 5. The collected water is then discharged in equal volumes from the discharge orifice and passes through the probe matrix. This allows the electronic circuitry to convert the signal received from the probe matrix into an indication representing the rainfall amount, to be described more fully herein.

The purpose of the equal water volume discharge means is to receive the rainwater collected, via the collector 1 and transfer means (items 2, 6, and 1b), and then to discharge the water in incremental and equal volumes, of rainfall rate, into a sensor or probe matrix (items 8, 9, 10, 13, 15, and 18). To accomplish this task, without the use of any mechanical or moveable parts, the present invention uniquely combines three forces or characteristics, which are; One, the force of gravity upon the water, two, the surface tension characteristics of water which is actually the gravitational attraction of the water upon itself, and three, the orifice restriction which opposses the downward pull of the gravity upon the water. The net effect of these forces is that the water will begin to accumulate in the funnel orifice combination until the mass of the accumulated water, or the gravitational force upon the same, overcomes or becomes greater than the opposing forces of both the orifice restriction and the surface tension characteristics of the water, at which time the water will then discharge from the orifice in the form of a droplet. The fact that the force of gravity, the surface tension characteristics of water, and the dimensions of the discharge orifice remain constant implies that the droplet volume will also be constant. There are however certain restrictions or guidelines to adhere to for the equal water volume discharge means to operate as described. The first being the material of construction and the dimensions of the funnel orifice combination. The material should be such that the funnel and orifice exhibit a very small degree of expansion or contraction over the operating temperature of 32 to 120 degrees fahrenheit, and the dimensions should be such so as to allow the water to discharge in the form of a droplet and in equal volumes. If the discharge orifice were too small a water collum would begin to develop in the funnel as a much greater force would be required to overcome the restiction to water flow created by the discharge orifice and the surface tension characteristics of water. When an adequate water height was achieved to overcome said opposing force the water would then discharge in the form of a stream and loosely connected droplets causing an inconsistency in the water volume being detected. On the other hand, if the discharge orifice were too large the water being discharged would not have required any accumulation prior to discharging and too would yield inconsistent volumes being detected. The angle of the discharge means in the present invention is 20 degrees, and the diameter of the discharge orifice is 5/32 of an inch, yielding a volume of water to be discharged at approximately 0.006 cubic inches.

Secondly, the water reaching the equal water volume discharge means should be relatively pure. This is accomplished by the filter means 2, and is required to assure that the water responds in a consistent manner, and that the equal water volume discharge means remains free of any contamination.

Thirdly, the water reaching the discharge orifice must have relatively little momentum of its own so as not to add an additional force to the equal water volume discharge means, as the subsequent effect could be a variance in the water droplet's volume. In this invention there are two devices working together to accomplish this task; the water transfer means 1b, and the momentum controller means 4. The transfer means comprises the deflector 6, which prohibits the rainfall, and more importantly the rainfall's momentum, from reaching the filter, and deflects the rainwater to the transfer surface 1b. The transfer surface then channels the water toward the filter 2. The slope of the transfer surface along with the surface composition is designed to contribute maximum resistance to the rainfall's momentum, and yet not resist to the point where it will not flow toward the filter. The net effect then of the deflector 6 and the transfer surface combination is to channel the rainwater to the filter 2 with as little momentum as possible. The intent being that the water being discharged from the filter will be relatively constant in volume, and that the filter will be protected from damage due the momentum of the precipitation being directly absorbed by the filter. The second important device being the momentum controller 4 which consist of a material that does not absorb water, and is constructed so as to channel the rainwater, received from the filter 2, to the discharge orifice at a relatively low rate of speed. In the present invention the construction consists of plastic fibers which are positioned loosely throughout the upper two thirds of the funnel portion of the equal water volume discharge means.

Fourthly, the water accumulating in the funnel orifice combination must be isolated from the effects of the pressure fluctuations caused by wind currents accross the collector opening. This isolation is accomplished by the filter 2, which covers a relatively small area. This fact, coupled with the very nature of the filter, greatly inhibits the passage or flow of air into the chamber housing the equal water volume discharge means. Also, due to pressure ports 7 located in the equal water volume support means 12, the pressure that is present in the equal water volume chamber, will be equally distributed to all exposed sides of the water accumulating in the funnel orifice combination. The net effect being that any pressure fluctuations present in the collector due to wind currents will not effect or contribute to the forces acting upon the water accumulating in the funnel orifice combination, and subsequently alter the water droplet's volume being discharged from the same.

And lastly, the rate at which the water enters the funnel orifice combination must not increase to the point where it exceeds the maximum discharge rate allowed by the equal water volume discharge means. In the present invention it has been determined that the maximum discharge rate allowable to maintain consistent accuracy is 2 drops per second. With a typical droplet volume in the present invention being 0.006 cubic inches, this rate would be 43.2 cubic inches per hour as shown in the following calculation;

MAX VOL.=(2 DROPS/SECOND)×(3600 SECONDS/HOUR)×(0.006 IN.$^3$VOLUME)=43.2 IN.$^3$

To assure that this limit is not exceeded the diameter of the collector must be designed so that with the maximum rainfall rate expected, the amount entering the equal water volume discharge means equals the limit of 43.2 inches per hour. In the present invention the maximum rainfall rate expected has been determined to be 10 inches per hour. Consequently then, the diameter of the collector was determined as follows;

$$\text{DIAMETER} = \sqrt{(4 \times \text{MAXIMUM VOL.})/(PI \times \text{MAXIMUM RAINFALL RATE})} = 2.345$$

The purpose of the probe matrix is to detect the passage of a water droplet that has been discharged from the equal water volume discharge means, and the to signal the electronic circuitry regarding the same. To detect the presence of the discharged water droplet, that will now be in free fall, the water droplet must momentarily and simultaneously make contact with two independent electrical conductors. These conductors will essentially be used to detect the resistance of the water droplet between the two conductors. Pure water has a resistance of approximately 500,000 ohms between two opposite surfaces of 1 cubic centimeter of water. The present invention incorporates conductors that are sized and positioned in such a way, that the resistance detected will typically be 300,000 ohms. For this resistance to be meaningful to the electronic circuitry, one conductor 15 must be connected to the circuitry ground via wire 18b, with the other conductor 9 being connected to the junction of resistor 19 and gate 20 via wire 18a, with the opposite end of resistor 19 being tied to the electronic circuitry's supply voltage (+V). These connections essentially comprise a two resistor voltage divider with one resistor being item 19 and the other being the resistance of the water droplet when present. The value chosen for resistor 19 will be such that the voltage applied to gate 20 will represent a logic low level when a water droplet is present in the probe matrix. In the present invention gates 20 and 21, as well as all logic gates, invertors, counters/dividers, and oscillators are constructed of Complementary Metal Oxide Semiconductor technology or CMOS, with all logical AND gates and invertors also incorporating Schmitt trigger inputs. Subsequently then a logical high as applied to one of said gates would be defined as being a voltage that's at least 86% of the supply voltage +V. Likewise a logical low level would be defined as being a voltage that's no greater than 14% of the supply voltage +V. As previously mentioned, the value of resistor 19 must be chosen so as to apply a logical low voltage to gate 20 when a water droplet is present in the probe matrix. Following then is the equation representing the desired voltage:

$$\frac{(+V) \times (\text{DROP RESISTANCE})}{(\text{DROP RESISTANCE}) + (\text{RESISTOR 19})} = (.14) \times (+V)$$

With the drop resistance typically being 300,000 ohms, solving for the value of resistor 19 yields 1,843,000 ohms. It should be noted that if the water droplet was not present in the probe matrix, the voltage being applied to gate 20 would be equal to +V qualifing as a logical high level, as resistor 19 would essentially become known as a pull up resistor.

Figure 2:
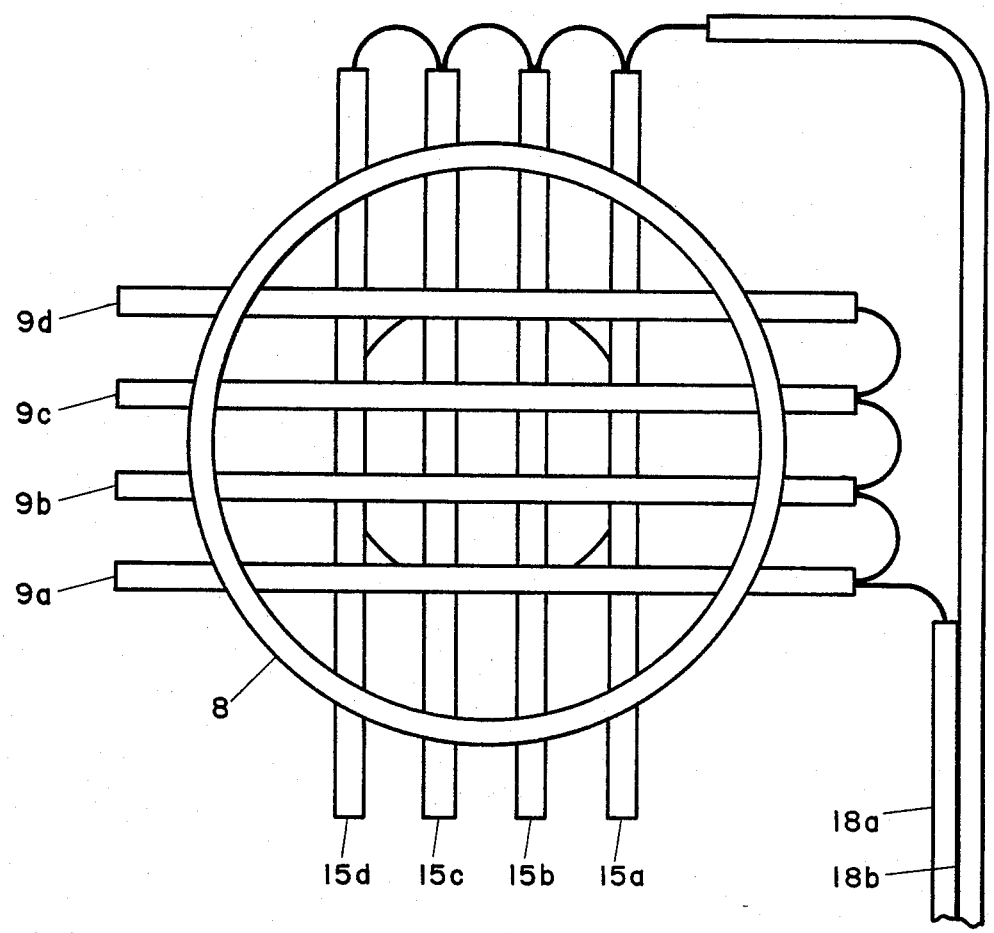
FIG. 2 is an enlarged, vertical view of the probe matrix portion of the present invention.

In the foregoing description of the probe matrix's function, it was defined as comprising two independent electrical conductors. In the present invention, the probe matrix is comprised of 8 electrical conductors as shown in FIG. 2, with the 4 conductors 15a through 15d being electrically tied together to represent the one electrical conductor that's connected to circuit ground via wire 18b, and the 4 conductors 9a through 9d being electrically tied together to represent the one conductor that's connected to the junction of resistor 19 and gate 20 via wire 18a. The reason for the pair of 4 conductors, each layered one above the other, in what appears to be from the view of FIG. 2, a perpendicular pattern, is twofold; One, the probe matrix can detect the passage of a water droplet that exhibits a trajectory from the equal water volume discharge means of up to 15 degrees from the zenith, providing the droplet passes through the cross sectional area of the probe matrix's conductors. This characteristic eliminates the need for critical alignment of the raingauge housing 11. And two, the fact that the two independent conductor layers are positioned vertically, the force of gravity will prohibit the water droplets from maintaining contact between the two conductor layers. Additional characteristics of the probe matrix design that also contribute to this benefit are the spacing between the conductor layers and also the spacing between the equal water volume discharge means and the probe matrix. These spacings are chosen so that the velocity of the water droplet as it enters the probe matrix is adequate to provide only momentary contact between the upper and lower conductor layers and then to fully discharge through the probe matrix and then exit through filter 17. The purpose of filter 17 is to insure a clean or uncontaminated inviroment for the equal water volume discharge means and the probe matrix.

Figure 3:
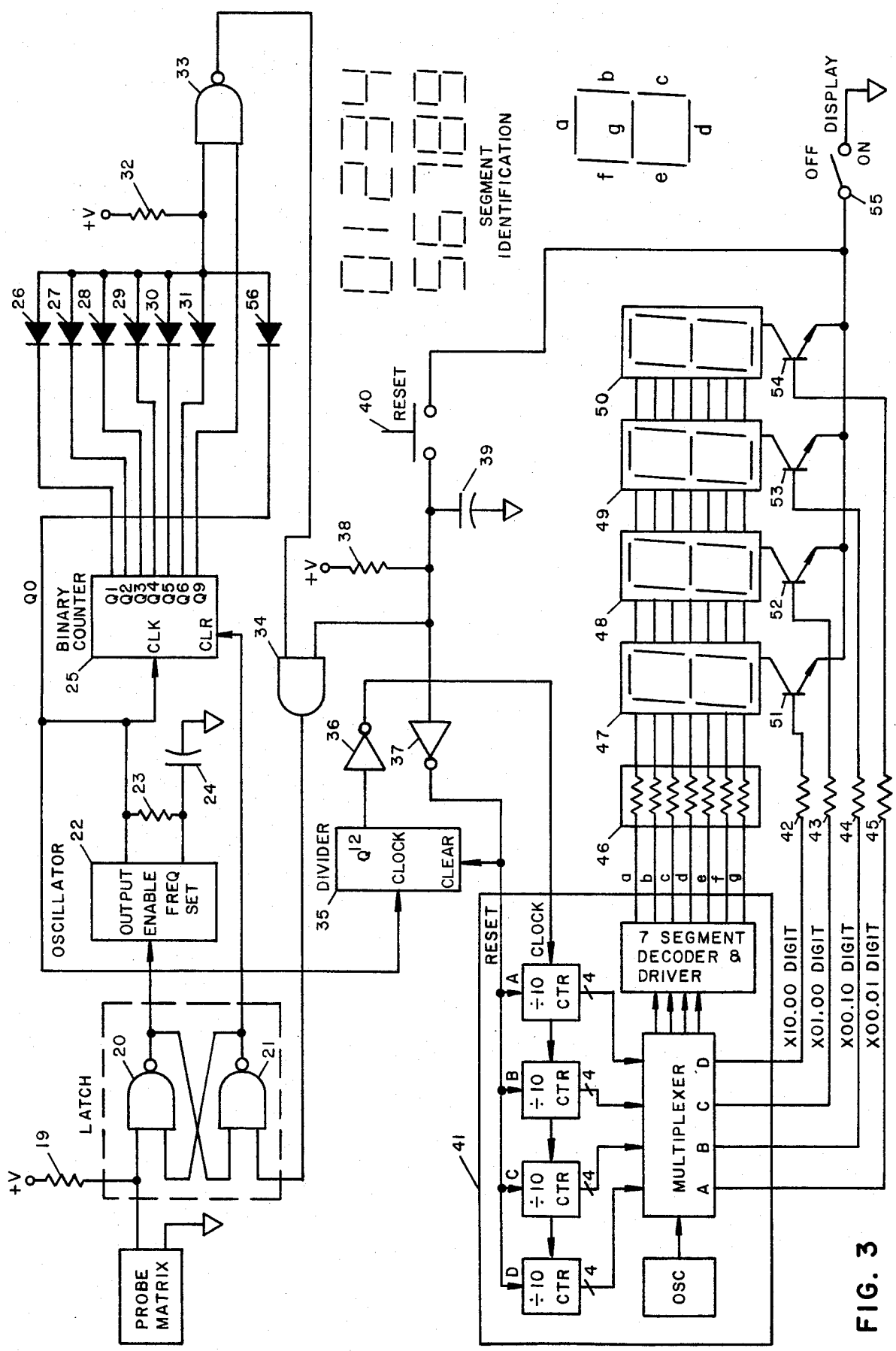
FIG. 3 is a schematic of the probe matrix signal receiver/convertor, the scaling counter, and the display, circuitry.

The function of the electronic circuitry then is to convert the detection of a water droplet being discharged, into a display representing the actual rainfall amount. In referring to FIG. 3, the following description in detail how this task is accomplished.

Item 41 comprises 4 binary coded decade counters that are cascaded together, along with the circuitry necessary to decode and drive the 4 digit display, items 47 through 50, to indicate the number present in said counters. In turn then, the number present in the 4 decade counters, and subsequently the 4 digit display, represents the rainfall amount. To increment the display, or decade counters by one count, representing an increase of 1 one hundreth of an inch of rainfall, requires a transition from a logic low to a logic high at the clock input of item 41. This clock signal is received from invertor 36 and originates from the Q12 output of binary divider 35. The Q12 output of binary divider 35 is actually the binary divider's clock input divided by 2 to the 12th power, or 4,096. Consequently then, for the Q12 output to go from a logic high to a logic low and then back to logic high, requires 4,096 similar cycles applied to the binary divider's clock input. To calculate how many of these cycles must be applied to the binary counter's clock input for each water droplet that's detected by the probe matrix, the following equation is used:

$$P = \frac{(4) \times (100) \times (4,096) \times (R)}{(PI) \times (D)} = \frac{(521,518.92) \times (R)}{(PI) \times (D)}$$

WHERE:
P = The number of cycles, or pulses being applied to binary divider 35 for each drop detected.
PI = 3.14159
R = Volume of discharged drop in cubic inches (0.006).
D = Diameter of collector opening in inches (2.345).

In the present invention solving for P yields the number 569 (rounded to nearest integer). Binary counter 25 is essentially identical to the binary divider 35 and is used to insure that the proper number of pulses, which in this design is 284, arrives at the binary divider clock input. When there is no drop present in the probe matrix the latch shown in FIG. 3, comprising gates 20 and 21, applies a logic high to binary counter 25 clear input which resets it to zero, and applies a logic low to the oscillator enable which causes the oscillator output to go to a steady state. Wen a drop is detected by the probe matrix the outputs of the latch circuitry just described will reverse, and remain in that state until the output of gate 34 goes to a logic low. This new state of the latch allows the oscillator to enable causing pulses to be applied to the binary counter 25 clock input. Diodes 26 through 31 in this design are functioning as an AND gate and can be removed or added to calibrate the circuitry based upon the water droplet's volume and the diameter of the collector as shown in the previous equation. The reason is that the number of pulses being applied to the binary divider 35 are the same number of pulses being applied to the binary counter 25. When the binary counter reaches the desired count, which in this case is 569, the signal applied to gate 21 from gate 34 will go to a logic low level, causing the latch to return to its original state. This in turn will disable the oscillator and clear the binary counter, which essentially prepares it for an additional cycle when the next discharged droplet is detected. To configure the diodes 26 through 31 to yield a count of 569 it must be understood that the outputs shown on binary counter 25 represents a division of its clock input by 2 raised to the outputs respective power. For example, the output Q5 is the clock signal divided by 2 raised to the 5th power or 32. This holds true for outputs Q0 through Q6 on binary counter 25. This allows the configuration to yield any count from 512 (all diodes removed with only the Q9 output being applied to gate 33) to 576 (all diodes installed). To obtain the count of 569 as required by the present invention, the following configuration must be used:

Q0(1)+Q3(8)+Q4(16)+Q5(32)+Q9(512)=569

Consequently then, diodes Q1, Q2, and Q6 must be removed for proper calibration.

Another important feature of the pulse count cycle is the frequency of the ocillator 22, which is determined by the value of resistor 23 and capacitor 24. The frequency must be chosen so that the count cycle can be completed prior to the arrival of the next droplet in the probe matrix and also be of a duration longer than the time required by the water droplet to pass through the probe matrix. The later requirement being do to the fact that the water droplet may make and brake contact with the probe conductor layers several times before completely discharging from the probe matrix. Once the latch circuitry has responded to the initial signal from the probe matrix it will change state and remain in that state until the pulse count cycle has been completed. This minimum time duration will typically be no greater than 1/10th of a second with the maximum time duration being 5/10ths of a second as the max drop rate equals 2 drops per second as described herein. Subsequently then, the oscillator frequency must be chosen so as to yield 569 pulses between 1/10th and 5/10ths of a second. Using 3/10ths of a second as the time duration the frequency is determined as follows:

FREQUENCY=(569 PULSES)/(3/10 SECONDS)=1897 HZ. (ROUNDED)

Switch 55 is used to disable or enable the display, as when the display is disabled the power consumed by the electronic circuitry is extremely low, making it easily suitable for battery operation. Other than the display function this switch does not effect the function of the circuitry with the exception of enabling switch 40, which is used to reset all the circuitry to the initial operating state which includes reseting all counters, and subsequently the display, to zero. This same reset condition occurs when the supply voltage is first applied to the circuitry as capacitor 39 will appear as a short to circuit ground until it charges up to a logical high level through resistor 38.

What is claimed:
1. A gauge for measuring low to heavy rainfall comprising,
   (1) A rainwater collection means (1) having an upwardly facing opening (1a) and a downwardly sloping base (1b) leading to a smaller opening,
   (2) a rainwater transfer means including a filter (2) below said smaller opening and a deflector (6) preventing direct impingement of rainwater upon the filter,
   (3) An equal water droplet volume discharge means (3,4, 5) including a discharge funnel (3) positioned below said filter terminating in a discharge orifice (5) and a mass of loosely packed fibers within said discharge funnel.

2. A claim according to claim 1 where the discharge funnel has an angle of 20 degrees and the discharge orifice has a diameter of 5/32 of an inch.

3. A claim according to claim 1 where the loosely packed fibers used to control the rate of transfer of rainwater from the filter to the discharge orifice is comprised of nonabsorbant plastic fibers.

4. In a rain gauge, a drop forming and counting device comprising, means forming drops of uniform size, and a probe matrix including two sets of electrical conductors each comprising a layer below the drop forming means, each set of conductors located in a plane parallel to the other set a distance smaller than the uniform drop size so that drops passing through the probe matrix makes momentary electrical contact with the two conductor sets.

5. A probe matrix according to claim 4 where the two conductor layers are comprised of small wire like parallel conductors positioned 3/16 inches apart and 3½ inches below the discharge orifice, the conductors of each layer extending 90 degrees to the other.

* * * * *